United States Patent

Maurin et al.

Patent Number: 5,972,115
Date of Patent: Oct. 26, 1999

[54] OPTICAL FIBER PREFORM FABRICATION INSTALLATION

[75] Inventors: Laurent Maurin, Loison Sous Lens; Gérard Lavanant; Didier Pezet, both of Lambersart, all of France

[73] Assignee: Alcatel, Paris, France

[21] Appl. No.: 08/982,075

[22] Filed: Dec. 1, 1997

[30] Foreign Application Priority Data

Dec. 2, 1996 [FR] France .................................. 96 14738

[51] Int. Cl.⁶ ................................................ C03B 37/018
[52] U.S. Cl. ............................................ 118/715; 118/722
[58] Field of Search .................................. 118/715, 722; 432/205; 373/34

[56] References Cited

U.S. PATENT DOCUMENTS 4,302,230  11/1981  MacChesney et al. .

FOREIGN PATENT DOCUMENTS

3924288A1  1/1991  Germany .
WO8902419  3/1989  WIPO .

OTHER PUBLICATIONS

Patent Abstracts of Japan, vol. 7, No. 122, (C–168), May 26, 1983 corresponding to JP 58 041734 A (Showa Densen Denran Co., Ltd.) dated Mar. 11, 1983.

Patent Abstracts of Japan, vol. 6, No. 11 (C–88), Jan. 22, 1982 corresponding to JP 56 134528 A (Fujitsu Co. Ltd.) dated Oct. 21, 1981.

Patent Abstracts of Japan, vol. 11, No. 365 (C–460), Nov. 27, 1987 corresponding to JP 62 138338 A (Sumitomo Electric Ind. Co., Ltd.) dated Jun. 22, 1987.

Patent Abstracts of Japan, vol. 9, No. 171, (C–291), Jul. 16, 1985 corresponding to JP 60 041537 A (Sumitomo Electric Ind. Co., Ltd.) dated Mar. 5, 1985.

*Primary Examiner*—Bruce Breneman
*Assistant Examiner*—Alva Powell
*Attorney, Agent, or Firm*—Sughrue, Mion, Zinn, Macpeak & Seas, PLLC

[57] ABSTRACT

An installation for fabricating an optical fiber preform includes a reaction tube and an excess silica soot exhaust tube equipped internally with a screw having flat helical threads for removing the excess soot. The screw is a helix hollowed out longitudinally and the installation includes a cylinder housed within the interior passage of the helix, eccentrically disposed within this passage and bearing against the inside surface of the helix. The cylinder is rotated about its axis.

10 Claims, 2 Drawing Sheets

OPTICAL FIBER PREFORM FABRICATION INSTALLATION

BACKGROUND OF THE INVENTION

1. Field of the invention

The present invention concerns the fabrication of an optical fiber preform by the CVD method. It is more particularly concerned with an optical fiber preform fabrication installation including a device for removing excess soot during the fabrication of the preform.

2. Description of the prior art

In a manner well known in the fabrication of an optical fiber preform by the CVD method, silica soot is obtained in a reaction tube from a gaseous mixture injected into the latter and this soot is vitrified by heating it using a mobile torch executing successive passes along the tube rotating on its axis. The soot obtained beyond the travel of the torch is not vitrified. This excess soot is received and deposited in the downstream end part of the reaction tube, beyond the travel of the torch, or in an exhaust tube connected to the reaction tube, substantially all of the length of which is then swept by the torch. It is removed to prevent clogging of the area in which it is deposited and resulting defects in the preform.

Document JP-A 5841734 discloses a device for removing excess soot including a rod mobile in translation and equipped with a terminal screw with flat helical threads which scrape the interior surface of the deposition area to remove the soot into a collecting box.

A device of the above kind is not always satisfactory because the excess soot can accumulate between the threads of the screw so that the latter is rendered ineffective and/or be pushed back towards the preform.

Document WO 89/02 419 describes another device for removing excess soot downstream of a preform during fabrication of the latter. This device includes a screw type structure that rotates in the exhaust tube and is formed by a tubular pipe wound in a spiral. This pipe is a pressurized gas injection pipe and is provided with holes open towards the outlet of the exhaust tube, in order to create a flow of gas entraining the excess soot towards the outlet of the exhaust tube. The tubular screwthreads do not achieve very effective scraping of the deposition area. Moreover the gas pressure in this pipe must be sufficient for the flow of gas in the exhaust tube to be effective. On the other hand, there is the risk of causing turbulence prejudicial to the quality of the preform.

An aim of the present invention is to avoid the drawbacks of the above prior art systems.

SUMMARY OF THE INVENTION

The present invention consists in an installation for fabricating an optical fiber perform by the CVD method including a reaction tube adapted to rotate on its axis and associated with a torch that is mobile in translation to obtain silica soot from a gas mixture injected via an inlet end of the reaction tube and its vitrification therein, an exhaust tube extending the reaction tube at the end opposite the inlet end and equipped internally with a screw having flat helical threads to remove excess soot received from the reaction tube into the exhaust tube, the screw having an outside diameter substantially equal to the inside diameter of the exhaust tube, wherein the screw is a helix hollowed out lengthwise to define an inside axial channel and the installation includes a cylinder housed in the passage, eccentric to the latter and in contact with the interior surface of the helix and adapted to rotate on its axes in the passage.

The above installation can also have at least one of the following additional features:

the threads of the screw have a rectangular trapezoidal profile and the slant side between the two opposite bases is preferably truncated, the installation includes a drive system for rotating the cylinder and the screw in opposite directions via an associated rotary seal, the screw being preferably rotated in the opposite direction to the reaction and exhaust tubes so that the soot removal flowrate is maximized, the installation includes a collecting box for excess soot removed from the exhaust tube, the box being coupled to the exhaust tube, and preferably further includes means for injecting a neutral gas into the collecting box.

The features and advantages of the invention will emerge from the description of one embodiment given by way of example and illustrated by the accompanying drawings.

DETAILED DESCRIPTION OF THE PREFERRED EMBODIMENTS

Figure 1:
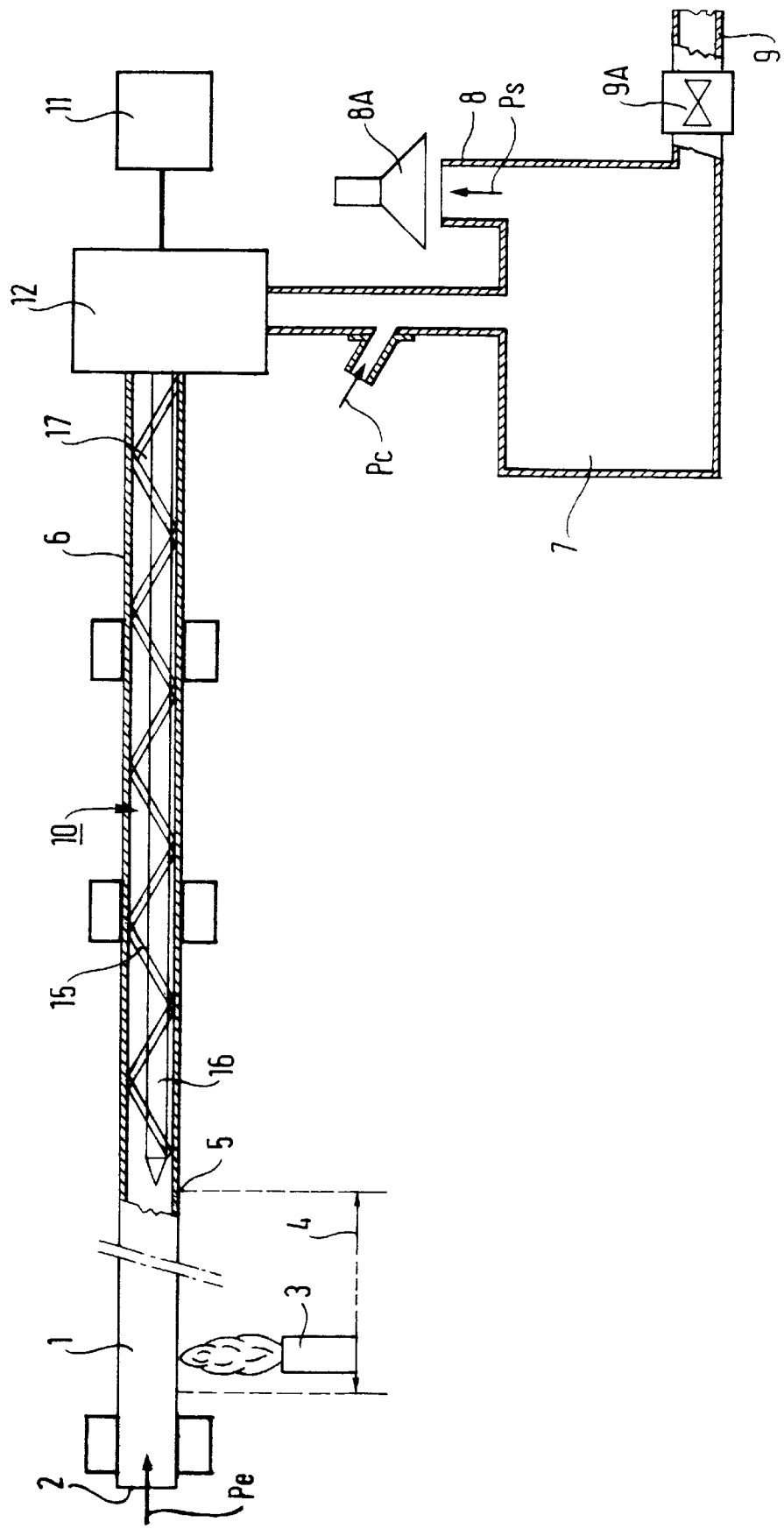
FIG. 1 is a schematic view of an installation in accordance with the invention for fabricating an optical preform.

FIG. 1 shows a reaction tube 1 for fabricating an optical preform by the CVD method. The tube 1 rotates about its axis on a glassmaking lathe. It receives via an inlet end 2 a gas mixture from which silica soot is produced. A torch 3 is mobile in translation along the reaction tube, its path 4 running substantially from the inlet end to a stop point 5. Each pass of the torch is followed by a return movement to the starting point with the torch turned off.

The reaction tube 1 is preferably longer than the path 4 of the torch so as to define directly an exhaust tube 6 for excess soot beyond this path. Alternatively, its length can be just slightly greater than that of the path of the torch and it can be connected to an excess soot exhaust tube.

The exhaust tube 6 is connected to a collecting box 7 for excess soot. The collecting box 7 is provided with a gas outlet 8 having a suction and filter system or hood 8A. It also has a soot removed pipe 9 leading to an anti-pollution device, not shown, via a selectively operable valve 9A mounted on the pipe 9.

A device 10 for scraping and removing excess soot is mounted in the exhaust tube 6 to remove excess soot into the collecting box. It rotates in the exhaust tube and to this end is connected to a drive system 11 via a rotary seal 12. The rotary seal couples the drive system 11 to the device 10 and the exhaust tube 6 to the collecting box 7.

The reaction tube 1, the exhaust tube 6 and the collecting box 7 constitute a sealed system that is internally pressurized because of the inlet pressure Pe of the gas mixture injected into the reaction tube 1, the outlet pressure Ps of the gas from the collecting box 7 and an additional pressure Pc of a neutral gas such as nitrogen injected at a distance from the reaction tube 1. This neutral gas is injected into the collecting box 7, preferably in the pipe coupling it to the exhaust tube 6. Its pressure is chosen so that Pe>Pc>Ps to create a head loss increasing the internal pressure in the reaction and exhaust tubes without causing turbulence. This increase in the internal pressure in these tubes prevents the reaction tube 1 collapsing as the torch 3 completes a pass through shrinkage leading to a variation in its diameter and thus prevents any disturbance to the geometry of the preform.

Figure 2:
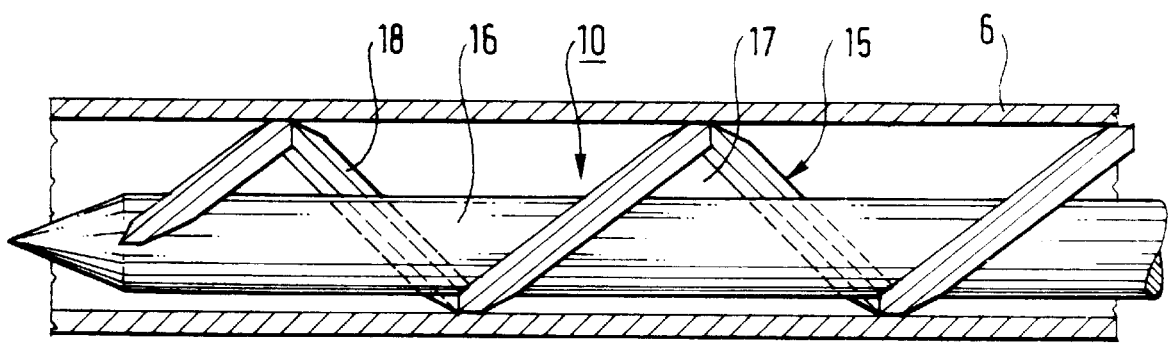
FIG. 2 is a fragmentary longitudinal view to a larger scale than FIG. 1 of the installation and more particularly of a device for removing excess soot provided therein.
Figure 3:
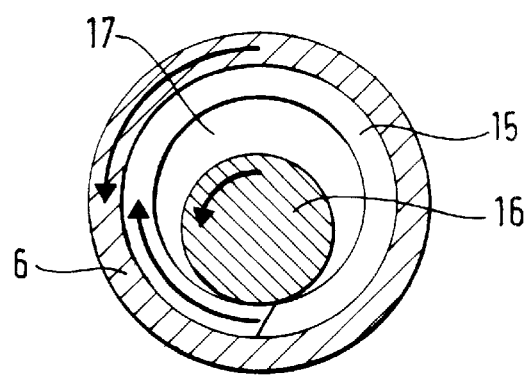
FIG. 3 is a cross-sectional view of the device from FIG. 2.

The excess soot removal device is described in more detail with more particular reference to FIGS. 2 and 3. It includes a hollowed out screw 15 that preferably rotates on its axis in the exhaust tube 6 and a cylinder 16 that rotates on its axis inside the hollow screw.

The hollow screw 15 defines an axial passage 17 surrounded by a helix 18 with flat threads. Its outside diameter is substantially equal to the inside diameter of the exhaust tube, the helix being therefore axially oriented and substantially in contact with the inside surface of said exhaust tube. The angle of the threads of the helix is preferably 45°. The helix extends the whole length of the exhaust tube, substantially from the point 5 at which the torch stops.

In contrast, the cylinder 16 is mounted eccentrically in the interior passage 17 of the screw and comes into longitudinal contact with its inside surface. It is preferably solid but can be hollow provided that it is of sufficient mass to prevent vibration of the rotary cylinder and resulting vibration of the screw in the exhaust tube.

The conjugate action of the hollow screw and the eccentric rotary cylinder inside the screw leads to effective drainage of excess soot into the collecting box and renders the device 10 self-cleaning. The hollow screw 15 preferably rotates in the exhaust tube 6 to optimize the effectiveness of the device 10. It rotates on its axis in the opposite direction to the exhaust tube 6 and the cylinder 16 in order to remove the excess soot with a maximal flowrate. The inside cylinder 16, which assures self-cleaning of its peripheral surface and of the inside surface of the screw, prevents accumulation of soot between their surfaces and between the threads of the screw. The gases are removed from the reaction tube simultaneously via the space between the cylinder 16 and the hollow screw 15.

The end of the cylinder 16 situated on the same side as the reaction tube 1 is at a short distance from the point 5 at which the torch stops. It has a pointed profile to favor the flow of gas against it and to prevent turbulence.

The drive system 11 for the rotary screw and the rotary cylinder in the exhaust tube is of a type known in itself and is therefore not described here. It includes an epicyclic gear train coupling the screw and the cylinder to a common drive motor and can allow relative movement in translation of the screw and the cylinder in the exhaust tube to prevent unscraped dead areas in the latter. This translation of the screw and the cylinder is preferably effected during the return stroke of the torch after each of its passes along the reaction tube 1.

Figure 4:
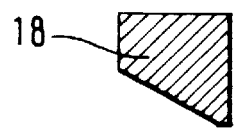
FIG. 4 is a view to a larger scale of the profile of one screwthread of the device from FIG. 2.
Figure 5:
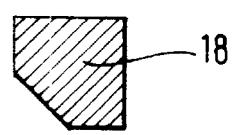
FIG. 5 is a variant of FIG. 4.

Referring to FIGS. 4 and 5, the profile of the threads 18 of the screw is advantageously trapezoidal, for efficient scraping of the exhaust tube and for good mechanical guidance of the rotary screw without generating vibration.

In FIG. 4, the thread 18 of the screw is the shape of a right-angle trapezium with the bases of the trapezium transverse to the axis of the screw, the shorter base is on the same side as the reaction tube and the end of the slant side bears against the surface of the exhaust tube. In FIG. 5 the profile of the threads is a truncated right-angle trapezium and the truncated side is the slant side which therefore comes into contact with the inside surface of the exhaust tube over a relatively large portion of its length, so making scraping more effective.

What is claimed is:

1. An installation for fabricating an optical fiber perform by the CVD method including a reaction tube adapted to rotate on its axis and associated with a torch that is mobile in translation to obtain silica soot from a gas mixture injected via an inlet end of said reaction tube and its vitrification therein, an exhaust tube extending said reaction tube at the end opposite said inlet end and equipped internally with a screw having flat helical threads to remove excess soot received from said reaction tube into said exhaust tube, said screw having an outside diameter substantially equal to the inside diameter of said exhaust tube, wherein said screw is a helix hollowed out lengthwise to define an inside axial channel and said installation includes a cylinder housed in said passage, eccentric to the latter and in contact with the inside surface of said helix and adapted to rotate on its axis in said passage.

2. The installation claimed in claim 1 wherein said threads have a substantially right-angle trapezium shape profile with the opposite bases transverse to the axis of said screw and the slant side substantially in contact with the inside surface of said helix.

3. The installation claimed in claim 2 wherein the profile of said threads is the shape of a truncated right-angle trapezium the truncated part of which is on said slant side and is adapted to bear on said inside surface of said helix.

4. The installation claimed in claim 1 wherein said cylinder has a pointed profile at one end on the same side as said reaction tube.

5. The installation claimed in claim 1 wherein said cylinder has sufficient mass to prevent vibration against said screw.

6. The installation claimed in claim 5 wherein said cylinder is solid.

7. An installation as claimed in claim 1 including a drive system for rotating said cylinder and said screw in opposite directions via an associated rotary seal, said screw rotating in the opposite direction to said reaction tube and said exhaust tube, assuring removal of excess soot at a maximal flow rate.

8. The installation claimed in claim 7 wherein said screw and said cylinder are adapted to be driven in translation relative to each other by said drive system.

9. An installation as claimed in claim 1 including a collecting box for excess soot removed from said exhaust tube coupled to said exhaust tube.

10. An installation as claimed in claim 9 including means for injecting a neutral gas into said collecting box.

* * * * *